United States Patent [19]
Iwata

[11] Patent Number: 6,009,752
[45] Date of Patent: Jan. 4, 2000

[54] YAW RATE DETECTOR AND METHOD FOR DETECTING YAW RATE

[75] Inventor: Hitoshi Iwata, Aichi-ken, Japan

[73] Assignee: Kabushiki Kaisha Tokai Rika Denki, Japan

[21] Appl. No.: 08/923,763

[22] Filed: Sep. 2, 1997

[30] Foreign Application Priority Data

Sep. 3, 1996 [JP] Japan ................................ 8-233092

[51] Int. Cl.[7] .............................. G01P 15/00; G01L 9/06
[52] U.S. Cl. .......................................... 73/514.09; 73/727
[58] Field of Search .......................... 73/504.05, 514.03, 73/514.09, 514.05, 514.06, 514.11, 512, 488, 727, 740; 338/36

[56] References Cited

U.S. PATENT DOCUMENTS

| | | | |
|---|---|---|---|
| Re. 33,360 | 10/1990 | Reynolds et al. | 73/740 |
| 4,658,651 | 4/1987 | Le | 73/727 |
| 4,823,605 | 4/1989 | Stein | 73/727 |
| 4,926,155 | 5/1990 | Colla et al. | 338/36 |
| 5,438,871 | 8/1995 | Hosoi et al. | 73/504.05 |
| 5,461,919 | 10/1995 | Laughlin | 73/514.03 |
| 5,509,308 | 4/1996 | Iwata et al. | 73/514.09 |
| 5,522,267 | 6/1996 | Lewis | 73/727 |
| 5,668,319 | 9/1997 | Garabedian | 73/514.09 |

*Primary Examiner*—Harshad Patel
*Assistant Examiner*—Robin Clark
*Attorney, Agent, or Firm*—D. Peter Hochberg

[57] ABSTRACT

A yaw rate detector and method of detecting yaw rate. The detector includes a sensor surrounded by a uniformly distributed gel-like material. The gel-like material is retained in a certain shape by a pair of parallel surfaces. The pressure of the gel-like material is affected by centrifugal force, which is sensed by the sensor. The sensor simultaneously detects pressure changes in the gel-like material on opposite sides of the sensor, which permits the detector to sense the angular velocity of rotation of the sensor. The sensor is a semiconductor pressure sensor formed on a circuit substrate.

13 Claims, 10 Drawing Sheets

_6,009,752_

YAW RATE DETECTOR AND METHOD FOR DETECTING YAW RATE

BACKGROUND OF THE INVENTION

1. Field of the Invention

The present invention relates to yaw rate detectors and method for detecting angular velocity.

2. Description of the Related Art

The yaw rate detectors are used to detect angular velocity when vessels or vehicles are turned. Yaw rate detectors typically include top type gyroscopes, optical gyroscopes, or the like. Furthermore, tuning fork type gyroscopes that use vibration have been introduced recently. However, the structures of these detectors are complicated. This makes the manufacturing of these detectors difficult and expensive.

SUMMARY OF THE INVENTION

Accordingly, it is an objective of the present invention to provide a yaw rate detector and a method for detecting angular velocity that simplifies the structure of the detector and reduces costs.

To solve the above problems, a yaw rate detector according to the present invention includes an actuator having uniform density, a flat circular holding body for maintaining the actuator in a circular shape for rotation about its center axis, and a detecting means for detecting pressure produced when centrifugal force changes the density of the actuator at two points, the two points being located along a line extending through the center axis and being equally spaced from the center axis.

Furthermore, a method for detecting angular velocity according to the present invention includes a detecting means deformed by the ambient pressure and located at the center of a circular portion, arranging an actuator having a constantly uniform density around the detecting means in the circular portion, and deforming the detecting means when centrifugal force changes the density of the actuator at two points during rotation of the circular portion, the two points being located along a line extending through the center axis of the circular portion and being equally spaced from the center axis.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 1(*b*) is a plan view of FIG. 1(*a*);

FIG. 18(*b*) is a plan view of FIG. 18(*a*).

DETAILED DESCRIPTION OF THE PREFERRED EMBODIMENTS (First Embodiment)

A first embodiment according to the present invention will now be described with reference to FIGS. 1 to 12.

Figure 1:
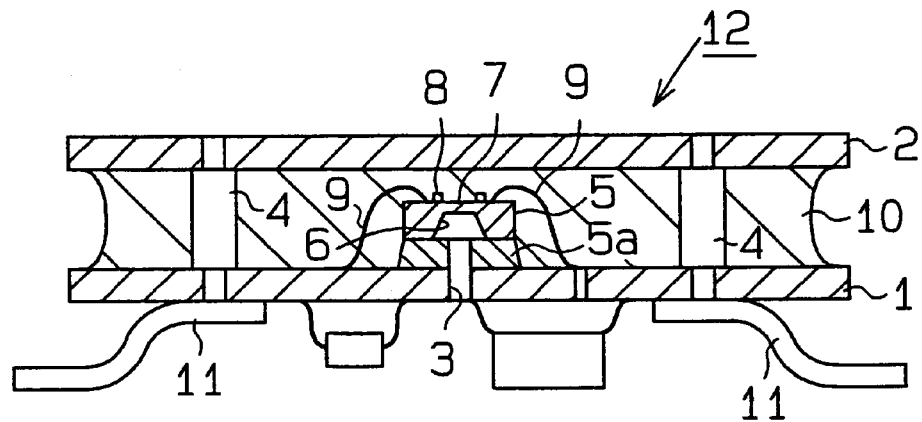
FIG. 1(*a*) is a cross-sectional view showing a yaw rate detector of a first embodiment according to the present invention.
Figure 1:
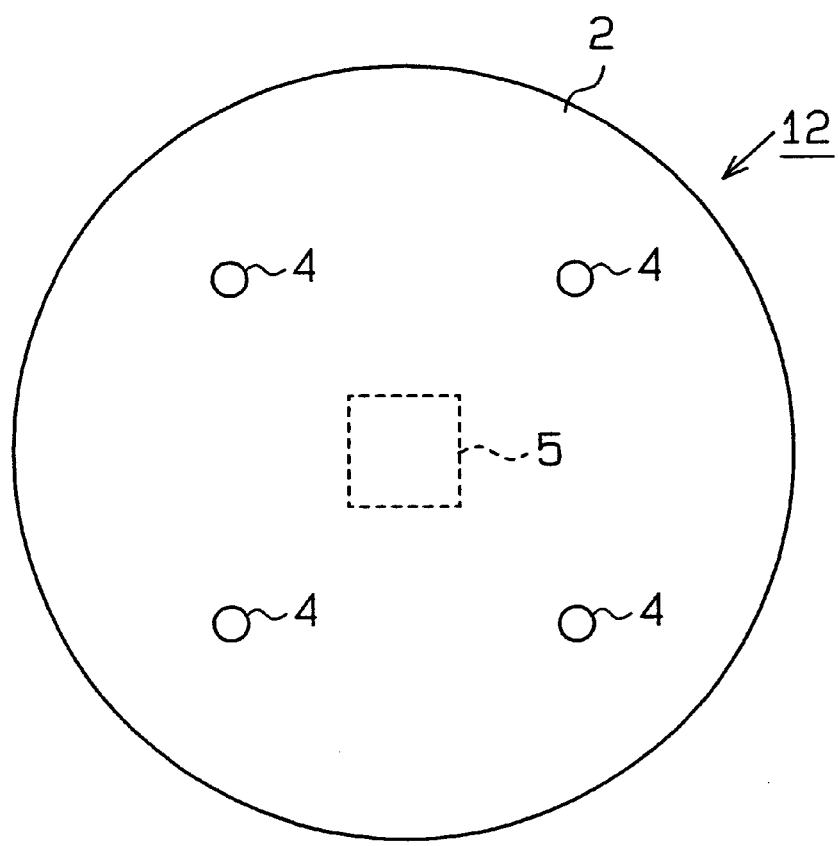

FIG. 1(*a*) is a cross-sectional view and FIG. 1(*b*) is a plan view showing a yaw rate detector 12.

A support body includes a circuit substrate 1, an upper housing 2, and spacers 4. The circuit substrate 1 is formed from ceramic or metal and has a flat circular shape. In this embodiment, each side of the circuit substrate is formed from ceramic. The upper housing 2, which is shaped identically to the circuit substrate 1, is secured to the circuit substrate 1 by four spacers 4, which are separated from one another by equal angular intervals with respect to the center of the circuit substrate 1. The upper housing 2 and the circuit substrate 1 constitute a rigid structure. Furthermore, the circuit substrate 1 constitutes a lower housing. The spacers 4 maintain a constant distance between the circuit substrate 1 and the upper housing 2.

A vent 3 extends through the center of the circuit substrate 1. A pressure detecting element 5, which is a diaphragm type semiconductor pressure sensitive sensor chip, is arranged on a seat 5*a* and above the center of the circuit substrate 1 to close the vent 3. The pressure detecting element 5 constitutes a semiconductor pressure sensor. The seat 5*a* and the pressure detecting element 5 are formed from the same material so that they have the same heat expansion coefficient. The seat 5*a* determines the height of the pressure detecting element 5.

The pressure detecting element 5 is formed by anisotropically etching the bottom portion of a rectangular parallelepiped shaped silicon material in a pyramidal trapezoid manner. The upper surface of the etched portion in the pressure detecting element 5 (hereafter referred to as recess 6) defines a thin portion 7 that functions as a diaphragm and serves as a sensing means. An upper surface of the thin portion 7 defines a sensing surface of the sensing means. A plurality of strain dispersion gauges 8, which are formed of a silicon semiconductor, are arranged on the upper surface of the thin portion 7 to serve as a digitizing means. Each strain dispersion gauge 8 converts pressure, which is sensed by the sensing means, to physical quantity. Each strain dispersion gauge 8 detects the strain on the thin portion 7 (or pressure acting on the thin portion 7) and outputs electric signals as detection signals in correspondence with the detected strain. To facilitate understanding, in FIG. 1, the illustrated thickness of the pressure detecting element 5 is greater than the actual thickness.

Figure 6:
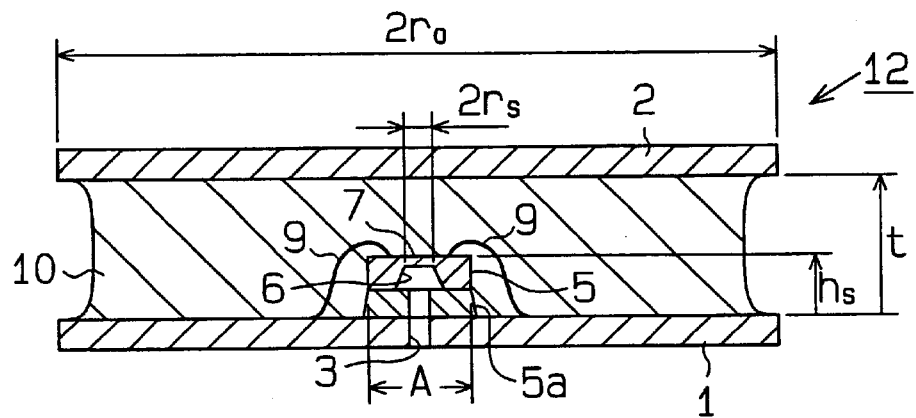
FIG. 6 is a schematic view showing the yaw rate detector.

The height $h_s$ of the sensing surface of the thin portion 7 of the pressure detecting element 5 from the circuit substrate 1 is one half the distance t between the circuit substrate 1 and the upper housing 2 (See FIG. 6). As shown in FIG. 6, A indicates the outer length of the pressure detecting element 5, $r_o$ indicates the radius of the upper housing 2 and the circuit substrate 1, and $r_s$ indicates the radius of the sensing surface. Furthermore, this embodiment satisfies the condition of $A<<2r_o$.

The recess 6 located at the lower side of the thin portion 7 communicates with the outside of the circuit substrate 1 through the vent 3. Bonding wires 9 electrically connect wiring patterns (not shown) of the pressure detecting element 5 and the circuit substrate 1. A gel-like material 10, which has the appropriate density, fills the space between the circuit substrate 1 and the upper housing 2 and encompasses the entire pressure detecting element 5. Furthermore, the gel-like material 10 is spread uniformly between the circuit substrate 1 and the upper housing 2, as shown in FIG. 1(a). The gel-like material 10, a silicone gel (the density of which ranges from about 0.9 g/cm$^3$ to 1.3 g/cm$^3$) serves as an actuator.

A pressure sensing portion is defined in the vicinity of the sensing surface of the thin portion 7 in the pressure detecting element 5. The gel-like material is spread out in a circular manner around the pressure detecting element 5.

In addition, attachment stays 11 are fixed to the bottom surface of the circuit substrate 1 to secure the yaw rate detector 12 to a measuring subject.

The operation of the above yaw rate detector 12 will now be described.

Figure 2:
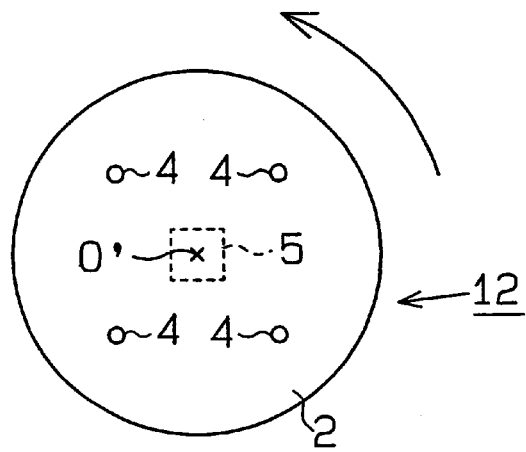
FIG. 2 is a diagrammatic view showing the yaw rate detector rotating about position O'.

The operation of the yaw rate detector 12 when rotated about position O' will first be described. When rotation applies angular velocity to the yaw rate detector 12 as shown in FIG. 2, the density of the gel-like material 10 at equal distances from the rotating center is altered by centrifugal force. This applies pressure to the pressure detecting element 5 and strains the semiconductor pressure sensor. The strain is detected by the sensing surface. The pressure detecting element 5 receives pressure, which bends or vibrates the thin portion 7 of the pressure detecting element 5. This varies the internal electric resistance of the pressure detecting element 5. The pressure detecting element 5 then outputs a detection signal in correspondence with the received pressure.

The bending and the vibration of the thin portion 7 strains the strain dispersion gauges 8 arranged on the thin portion 7. Each strain dispersion gauge 8 outputs an electric signal, which functions as a detection signal, in correspondence with the strain level (or pressure applied by the thin portion 7). In other words, the intensity of the detection signal indicates the angular velocity applied to the yaw rate detector 12.

Figure 7:
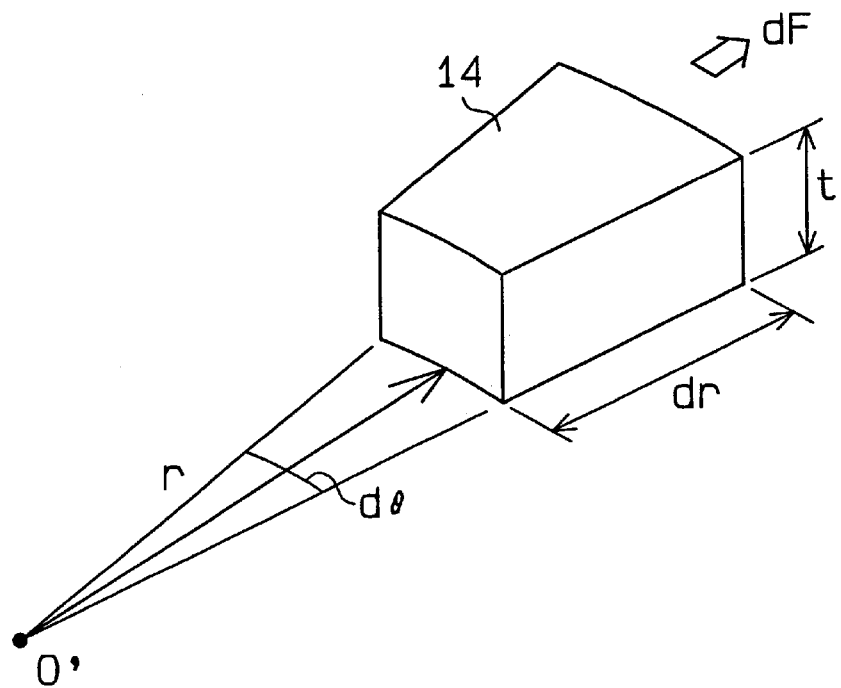
FIG. 7 is an explanatory view showing force acting on a gel-like material separated from the position O'.

The principle of the above described yaw rate detector 12 will hereafter be described with reference to FIGS. 6 to 8. FIG. 7 is a perspective view showing a fragment 14 of the gel-like material 10. The force dF applied to the mass m of the fragment 14, which is separated from position O' by distance r, during rotation (angular velocity ω) about position O', is obtained from the following equation (1):

$$dF = mr\omega^2 \quad (1)$$
$$m = t\cdot\rho\cdot r\cdot d\theta\cdot dr$$

In this equation, t indicates the thickness of the piece 14 (as shown in FIG. 6, the thickness of the gel-like material between the upper housing 2 and the circuit substrate 1), r indicates the distance from position O' to the fragment 14, dr indicates the radial length of the fragment 14, dθ indicates the arc angle of the fragment 14 with respect to position O', and ρ indicates the density of the gel-like material.

Figure 8:
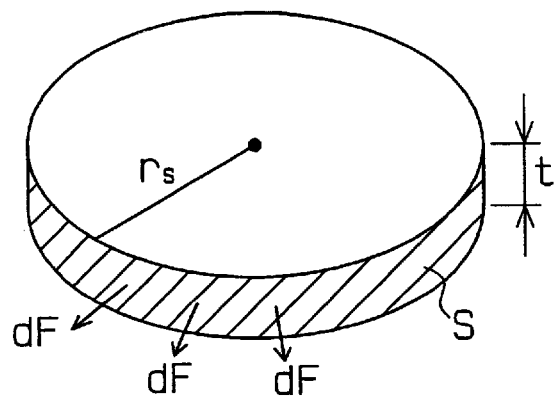
FIG. 8 is an explanatory view showing force acting on the center portion of a pressure sensitive element.

As shown in FIG. 8, the total force $F_s$ applied to center portion of the pressure detecting element 5 at a certain radius, or to the peripheral surface S of the sensing surface of the thin portion 7 located at radius $r_s$, is obtained from the following equations (2) or (3):

$$F_S = \int dF = \int_{r_S}^{r_0} \int_0^{2\pi} t\rho r^2 \omega^2 d\theta dr \quad (2)$$

$$= t\rho\omega^2 \int_{r_S}^{r_0} \int_0^{2\pi} r^2 d\theta dr = 2\pi t\rho\omega^2 \int_{r_S}^{r_0} r^2 dr$$

$$= \frac{2}{3}\pi t\rho\omega^2 (r_0^3 - r_S^3) \quad (3)$$

Pressure Ps acting on the sensing surface at radius $r_s$ is obtained from the following equation (4):

$$P_S = \frac{F_S}{S} = \frac{\frac{2}{3}\pi t\rho\omega^2(r_0^3 - r_S^3)}{2\pi r_S t} = \frac{1}{3}\rho\frac{(r_0^3 - r_S^3)}{r_S}\omega^2 \quad (4)$$

If the condition of $r_o>>r_s$ is satisfied, the pressure $P_s$ applied to the sensing surface of the pressure detecting element 5 is obtained from the following equation (5):

$$P_S = \frac{1}{3}\rho\frac{r_0^3}{r_S}\omega^2 \quad (5)$$

Figure 4:
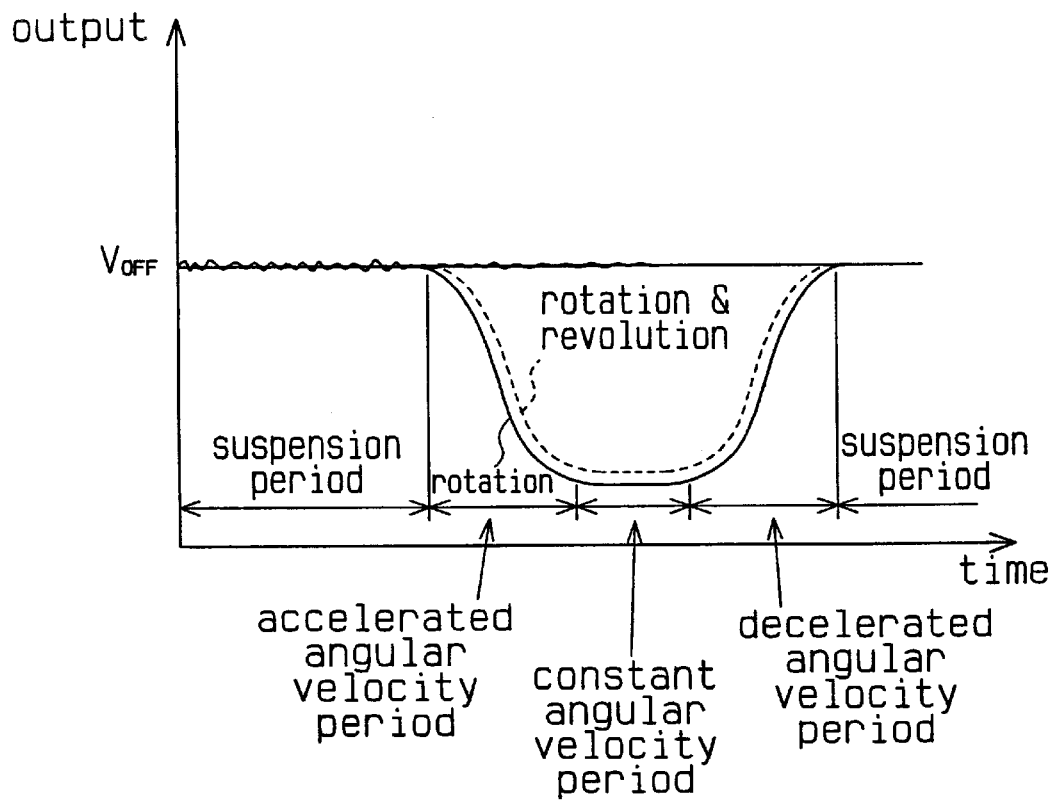
FIG. 4 is an output characteristic diagram taken when the yaw rate detector rotates about position O' and revolves about position O.
Figure 5:
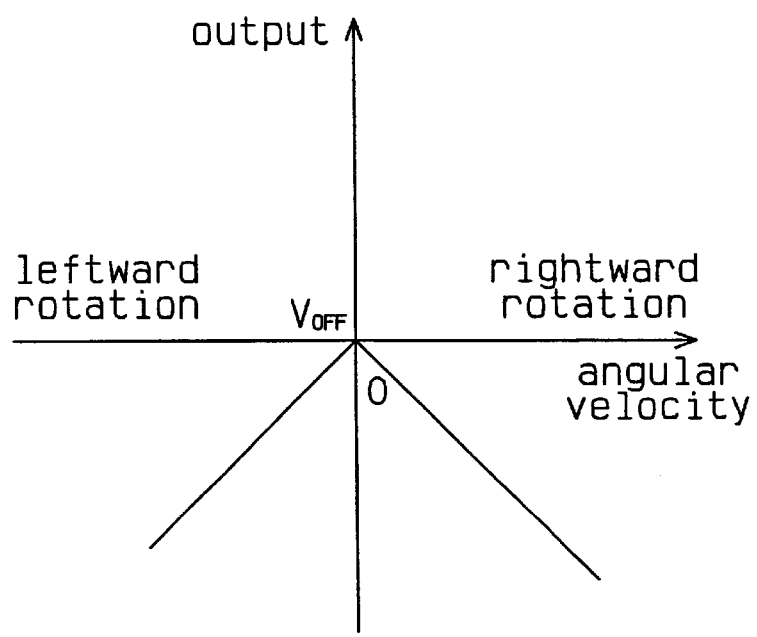
FIG. 5 is an output characteristic diagram of the yaw rate detector taken when rotated in different directions.

FIG. 4 is a diagram showing the voltage output characteristics of the yaw rate detector 12 with respect to time when rotating the yaw rate detector 12 in a single direction. FIG. 5 is also a diagram showing the voltage output voltage characteristics when rotating the yaw rate detector 12 rightward and leftward. In both drawings, the output is zero at $V_{off}$.

When rotated as described above, the output of the yaw rate detector 12 is as shown by the solid line in FIG. 4. As shown in the drawing, characteristics that define a suspension period during which there is no rotation, an accelerated angular velocity period during acceleration, a constant angular velocity period during which the angular velocity is constant, a decelerated angular velocity period during deceleration, and a suspension period during which there is no rotation, appear as time elapses.

The output characteristics of the yaw rate detector 12 during rightward rotation and leftward rotation are shown in FIG. 5. As shown in FIG. 5, if the angular velocity is the same, the same output is obtained regardless of whether the rotation is rightward or leftward. The rotating direction of the yaw rate detector 12 is not distinguished.

For example, under the following condition:
ρ≠1 g/cm³: the density of silicone gel
$r_o$=3 cm
$r_s$=0.01 cm,
$P_s$ computed from the above equation (5) is:
$P_s$=900ω²
The dimension of $P_s$ is dyn/cm².
For example, under the conditions of: ω=1°s=π/180 =1.7× 10⁻²/s,
$P_s$ is:

$$P_s=900\times(1.7\times10^{-2})=2.6\times1.0^{-1} \text{ (dyn/cm}^2)$$

Thus, when the output of the pressure detecting element 5 is 36 mV at 1 dyn/cm², $V_{out}$ is obtained as follows:

$$V_{out}=(36/1)\times2.6\times10^{-1}\times10^{-3}=9.36\times10^{-3} \ \mu V/(1°/s)$$

Therefore, if an amplifier is used to amplify the output of the pressure detecting element 5 by 200,000 times, the following output is obtained: $V_{out}$=1.9 mV/(1°/s)

Figure 3:
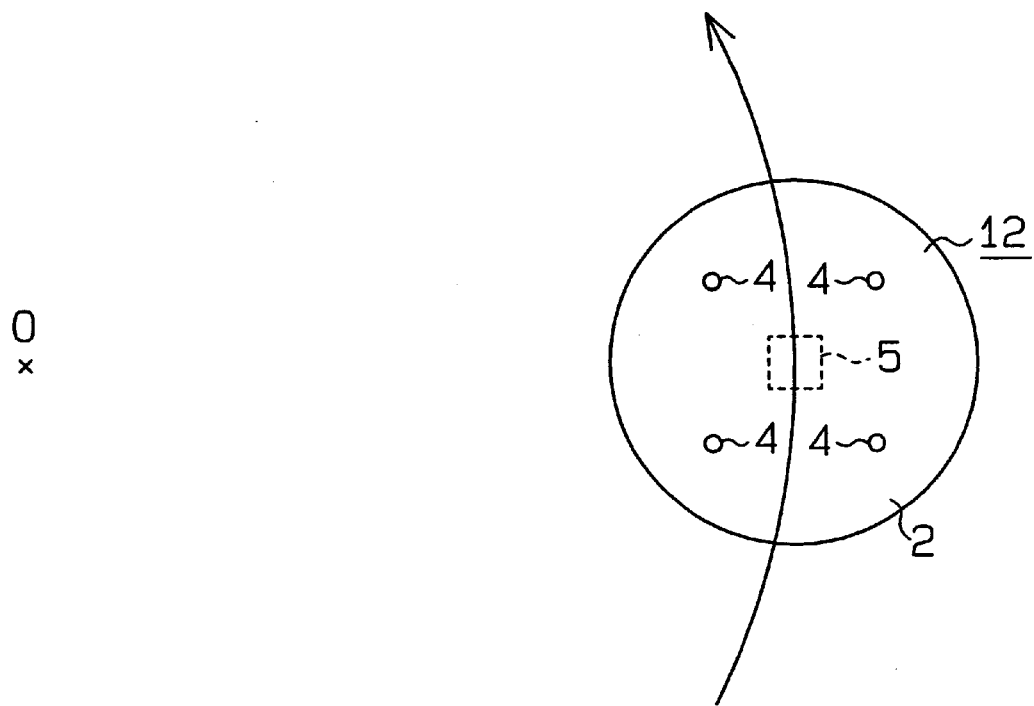
FIG. 3 is a diagrammatic view showing the yaw rate detector revolving about position O.
Figure 9:
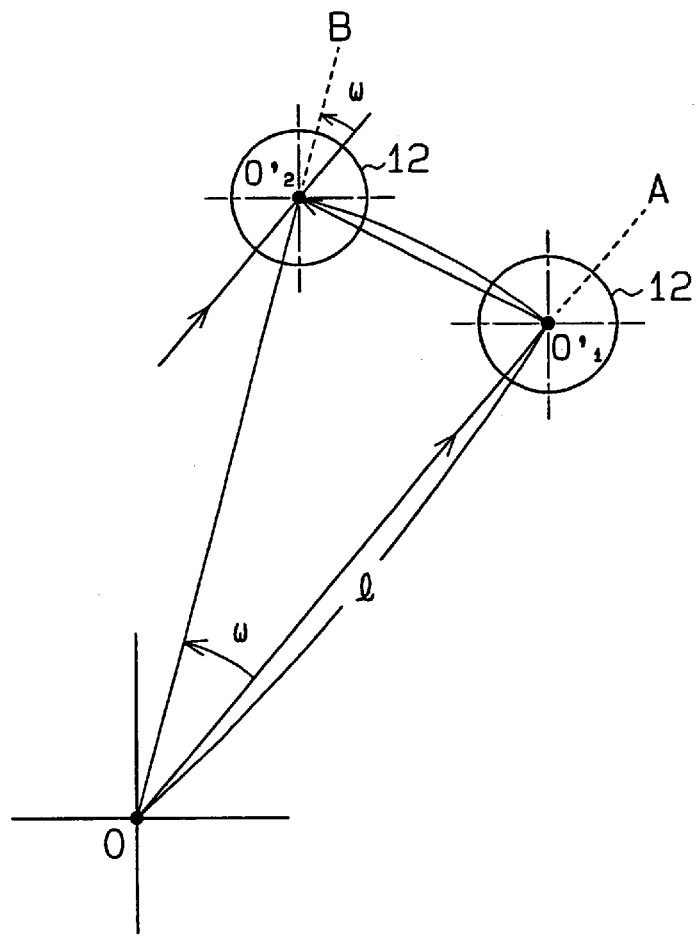
FIG. 9 is an explanatory view showing the yaw rate detector revolving about position O and rotating about position O'.
Figure 10:
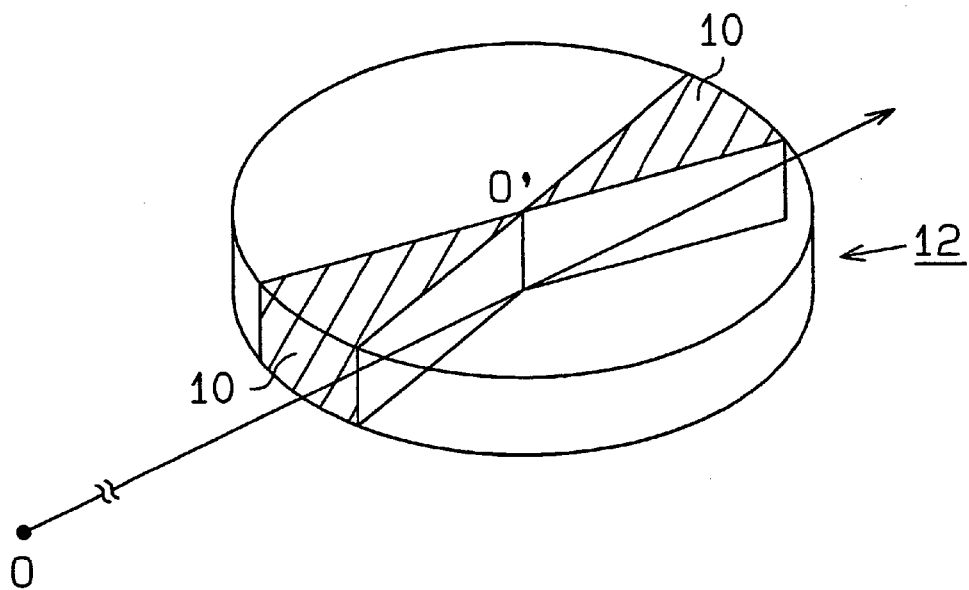
FIG. 10 is an explanatory view showing the yaw rate detector revolving about position O.
Figure 11:
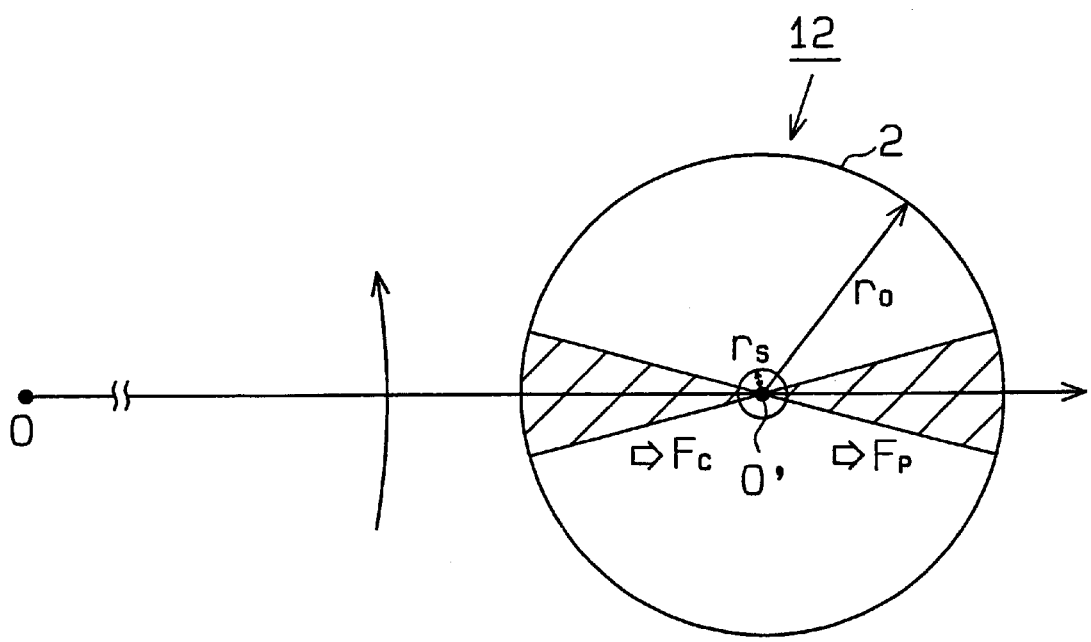
FIG. 11 is also an explanatory view showing the yaw rate detector revolving about position O.

Revolution of the yaw rate detector 12 about position O as shown in FIG. 3 will hereafter described with reference to FIGS. 9 to 11. FIG. 9 is a diagrammatic view showing the yaw rate detector 12 revolving about position O. FIG. 10 is a perspective view schematically showing the yaw rate detector 12, while FIG. 11 is a schematic plan view showing the yaw rate detector 12.

As shown in FIG. 9, when revolving about position O, which is separated from position O' of the yaw rate detector 12 by distance l, at angular velocity ω, the yaw rate detector 12 revolves about position O and position O'. FIG. 9 shows the yaw rate detector 12 being displaced from position O'₁ to position O'₂ at angular velocity ω. In this case, the gel-like material 10 receives forces (1) to (5) produced by rotation about position O' and by revolution about position O.

As described below, the force produced by revolution about position O applies no pressure to the center, or the detecting element 5, of the yaw rate detector 12. That is, the force applied to the pressure detecting element 5 by the gel-like material 10 due to revolution about position O includes compressive force and tensile force that act on the peripheral surface of the pressure detecting element 5. This assumes that condition $r_o$>>$r_s$ is satisfied.

The voltage output during the revolution about position O is shown by the dotted line in FIG. 4. The output is produced only by the angular velocity ω of the rotation about position O'. The output is not produced by the revolution about position O. The force acting on the yaw rate detector 12 in the thickness direction (the direction normal to the plane of the substrate 1) of the gel-like material 10, as shown in FIG. 12, will now be described.

Figure 12:
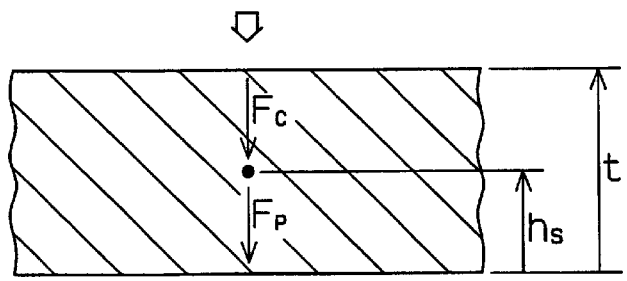
FIG. 12 is a partial cross-sectional view showing the gel-like material.

As shown in FIG. 12, compressive force $F_c$ and tensile force $F_p$ are applied per unit area on the boundary plane, which is located at height $h_s$ (t/2) from the sensing surface of the pressure detecting element 5. However, since the density ρ and the mass of the gel-like material 10 above and below the boundary plane are equal to each other, the equation of Fc=−Fp is satisfied. Furthermore, since the condition of A<<2 $r_o$ is satisfied in this embodiment, the pressure produced by the existence of the pressure detecting element 5 may be ignored. Thus, the pressure at the sensing surface of the pressure detecting element 5, which is located at height $h_s$ (t/2) from the circuit substrate 1, in the thickness direction of the gel-like material 10 is not detected by the pressure detecting element 5.

The detection results of the yaw rate detector 12 will now be described to confirm the operation and effects of the above yaw rate detector 12. The yaw rate detector 12 is fixed to the detected subject. The detected subject is then rotated about position O' of the yaw rate detector 12. The detected subject is also revolved about position O, which is separated from position O' of the yaw rate detector 12 by 5 cm.

Figure 13:
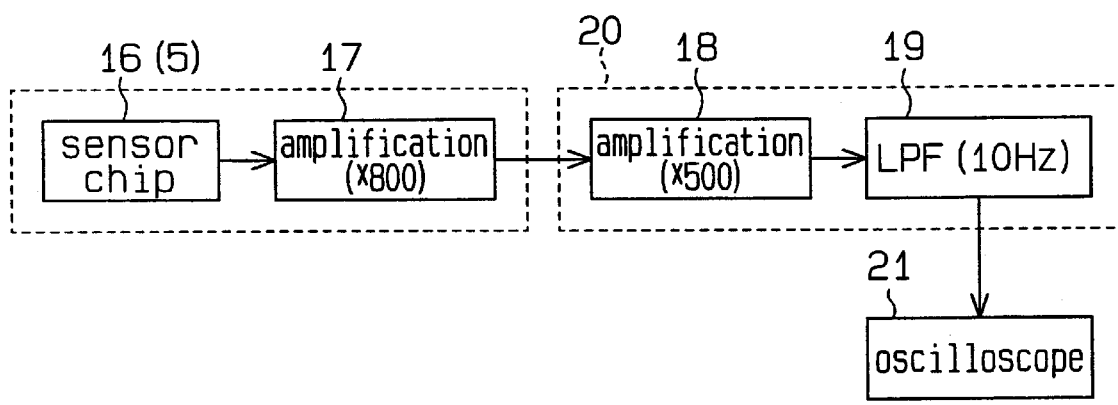
FIG. 13 is an electric block circuit diagram used during measurement.

FIG. 13 shows an electric circuit used for detection. In the electric circuit shown in FIG. 13, the pressure detecting element 5 is represented by a sensor chip 16. An amplifying circuit 17 provided on the circuit substrate 1 amplifies the output of the sensor chip 16 by 800 times and inputs the amplified output to an external circuit 20. The external circuit 20 includes an amplifying circuit 18, the amplification rate of which is 500 times, and a low-pass filter (10 Hz) 19. The pressure detecting element 5 is connected to an oscilloscope 21 by the external circuit 20. This sends signals of the pressure detecting element 5 amplified by 400,000 times to the oscilloscope 21.

Figure 14:
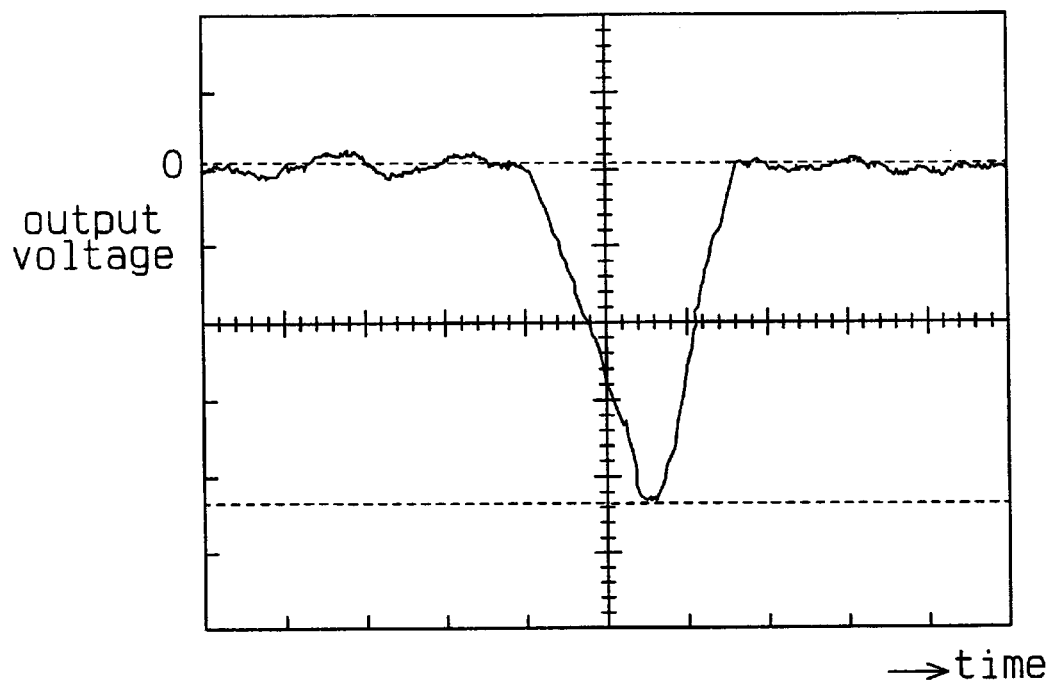
FIG. 14 is an output voltage characteristic diagram taken when measuring rightward revolution about position O.
Figure 15:
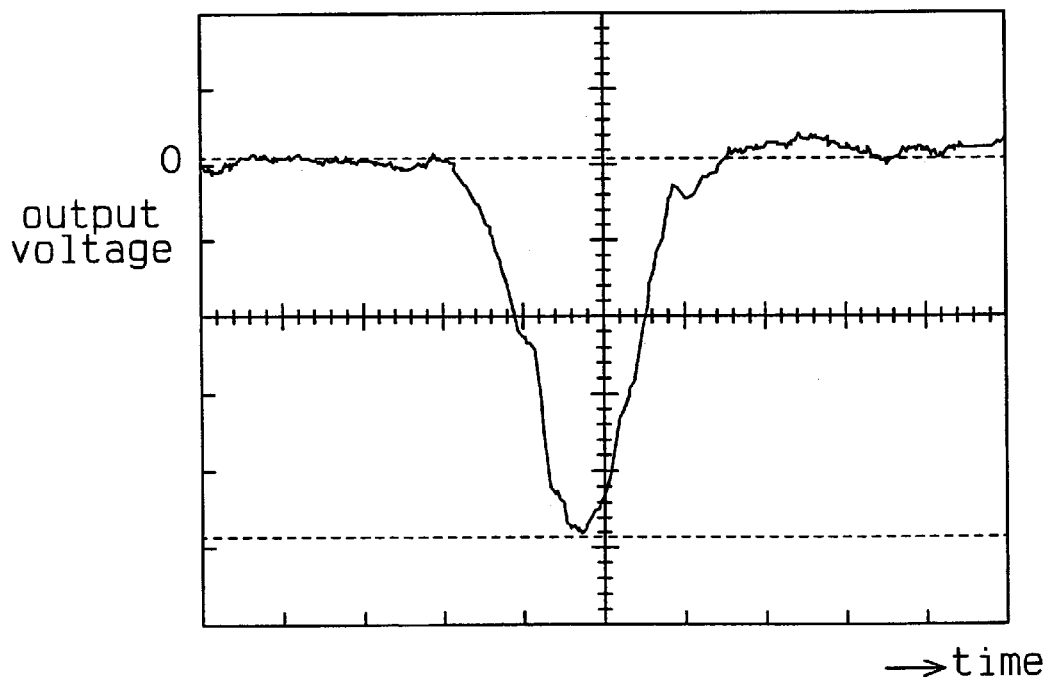
FIG. 15 is an output voltage characteristic diagram taken when measuring leftward revolution about position O.

The angular velocity of rotation about position O' and revolution about position O was approximately 90 degrees/ 300 msec. FIGS. 14 and 15 each show the results obtained during revolution about position O at a location separated 5 cm away. FIG. 14 shows the results for rightward revolution, while FIG. 15 shows the results for leftward revolution. In FIGS. 14 and 15, the horizontal axis represents time and is graduated at intervals of 100 msec. The vertical axis represents output voltage and is graduated at intervals of 500 mV. The units of each corresponding axis are the same in FIGS. 14 and 15.

Figure 16:
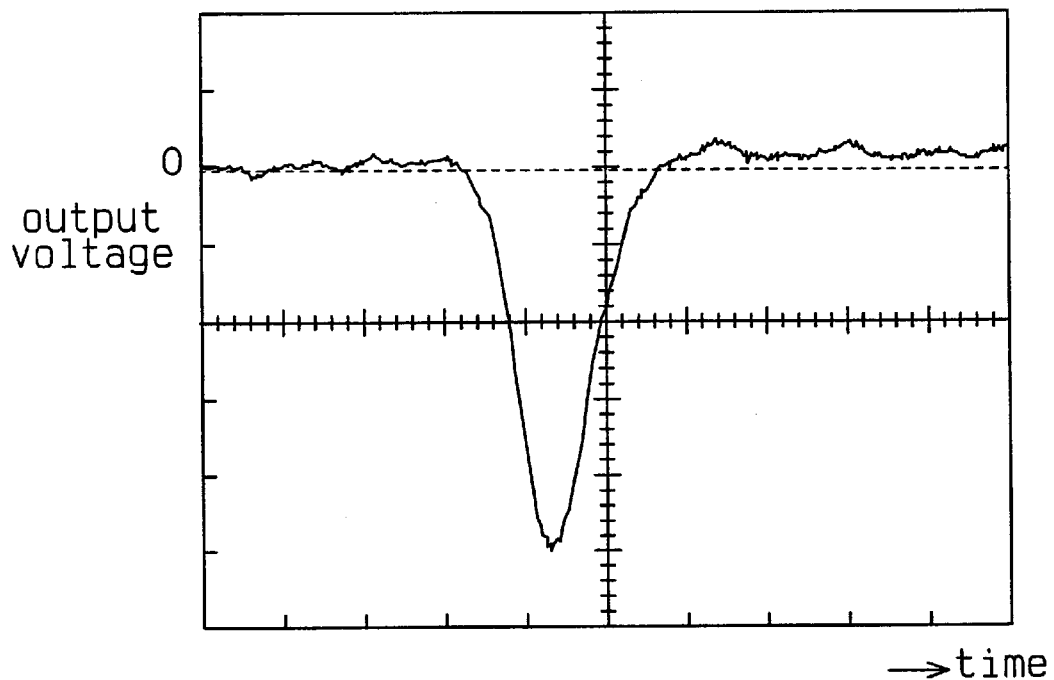
FIG. 16 is an output voltage characteristic diagram taken when measuring the rightward rotation about position O'.
Figure 17:
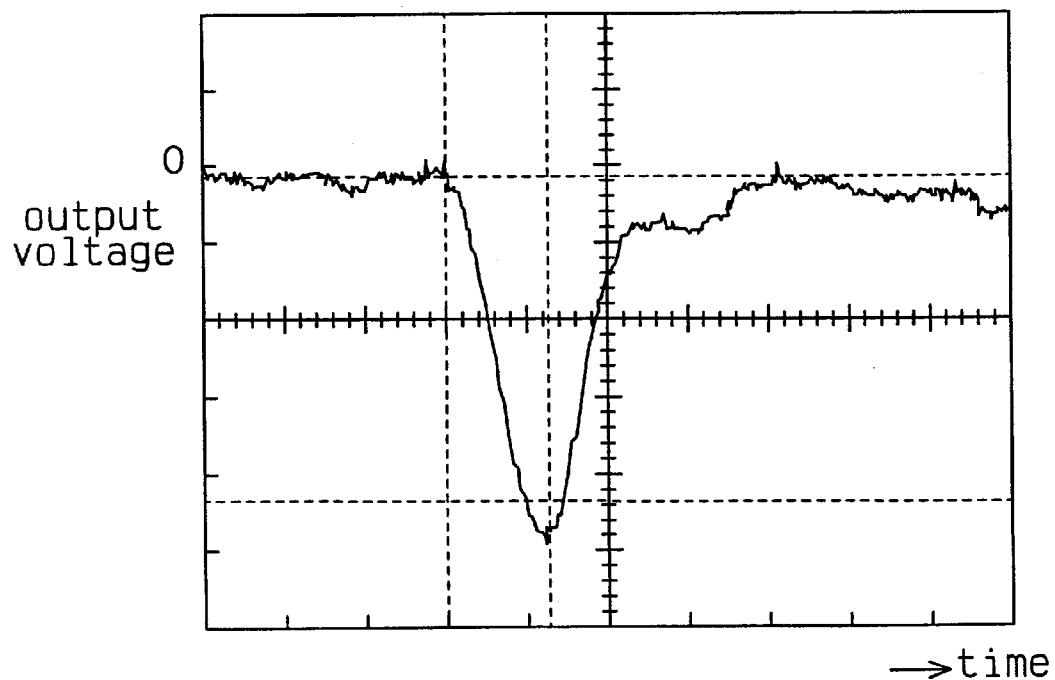
FIG. 17 is an output voltage characteristic diagram taken when measuring the rotation about position O' in a leftward direction.

FIGS. 16 and 17 show the results obtained during rotation about position O'. FIG. 16 shows the results for rightward rotation. FIG. 17 shows the results for leftward rotation.

A) As shown in FIGS. 14 to 17, preferable detecting sensitivity is achieved for both revolution about position O and rotation about position O'. Substantially the same output is obtained for rightward rotation and leftward rotation.

B) In the first embodiment, silicone gel is used as the gel-like material. Since the silicone gel is non-fluid, measures need not be taken to prevent leakage of the silicone gel when manufacturing the yaw rate detector 12. Furthermore, the silicone gel has a satisfactory damping property and thus absorbs impacts in a superior manner. This reduces the physical load applied to the pressure detecting element 5.

C) In the first embodiment, as apparent from the equation (5), the radius $r_o$ of the circuit substrate 1 and the upper housing 2 may be increased to improve output sensitivity.

(Second embodiment)

Figure 18A:
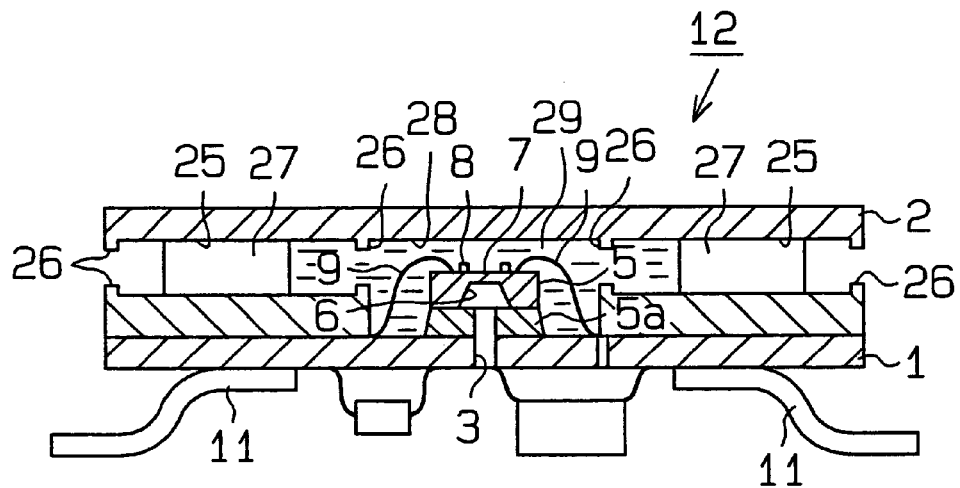
FIG. 18(*a*) is a vertical cross-sectional view showing a yaw rate detector of a second embodiment.
Figure 18B:
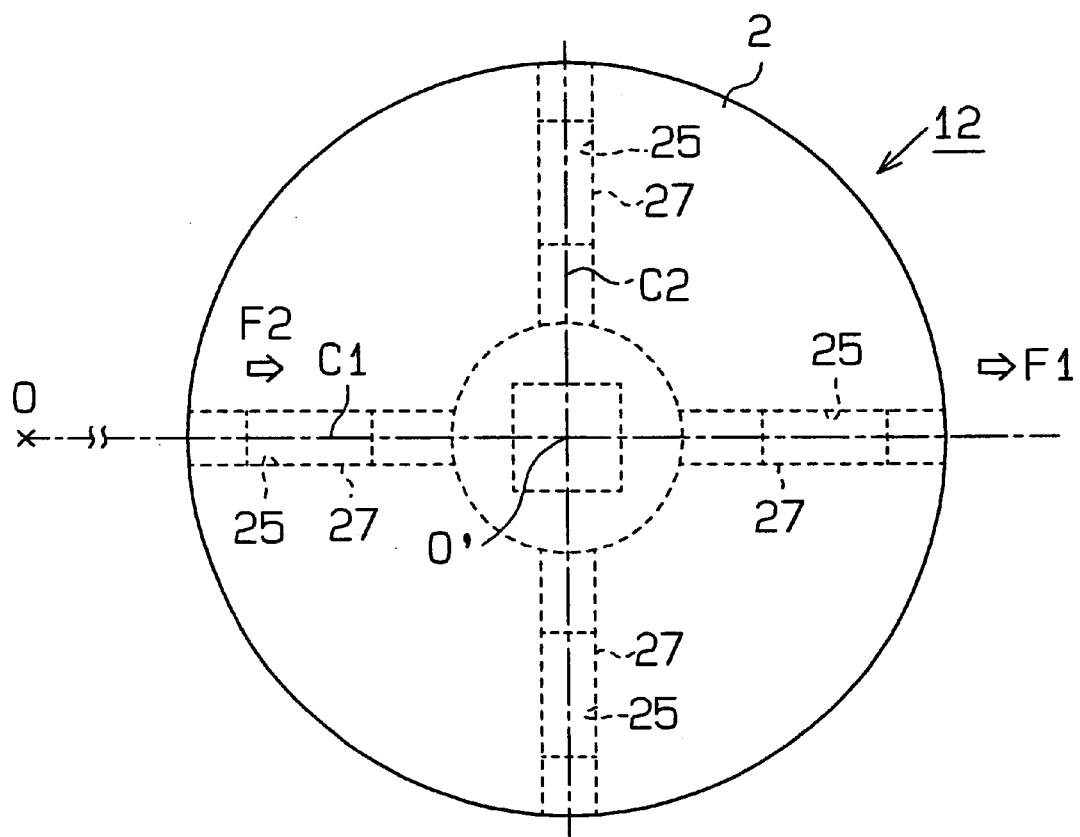

A second embodiment will now be described with reference to FIGS. 18(a) and 18(b). The same reference numerals are given to those components that are the same as the corresponding components of the first embodiment.

In this embodiment, the upper housing 2 is connected directly to the circuit substrate 1. Four guide bores 25 are arranged in a cross-like manner. Each guide bore 25 is aligned with middle line C1 or C2, which pass through position O' in a radial manner. Engaging projections 26 are arranged on each end of the guide bores 25. Each guide bore 25 slidably accommodates a metal slider 27. A silicone gel 29 fills a receiving chamber 28. The sliders 27 are identical to one another and have the same mass. Each slider 27 moves between engaging projections 26, which are provided on each end of the associated guide bore 25. The outer surface of the slider 27 and the inner surface of the associated guide bore 25 are in surface to surface contact with each other so that centrifugal force moves the slider 27 and so that pressure is produced inside the guide bore 25 when the slider 27 moves radially outward in the guide bore 25. In addition, as shown in FIG. 18(a), each slider 27 is normally located between the periphery of the circuit substrate 1 and the pressure detecting element 5 in the associated guide bore 25.

The receiving chamber 28 is defined in the center portion of the upper housing 2 to receive the pressure detecting element 5. The receiving chamber 28 is communicated with the inner end of each guide bore 25 and is filled with the above-described silicone gel 29. Pressure produced by the silicone gel 29 is sensed by the pressure detecting element 5 in the receiving chamber 28.

Operation of the above yaw rate detector 12 will now be described. When the yaw rate detector 12 rotates about position O', centrifugal force moves each slider 27 toward the outer end of the associated guide bore 25. The pressure produced in correspondence with the angular velocity in the inner side of each guide bore 25 and the receiving chamber 28 is sensed by the pressure detecting element 5. This results in detection of the angular velocity. When rotation is stopped, centrifugal force is not applied to the sliders 27. Thus, each slider 27 returns to the position at which it was located before rotation.

The sliders 27 slide in the associated guide bore 25 regardless of the direction of rotation, and thus function to actuate the pressure detecting element 5. Revolution about position O applies, for example, force F1 to one of the sliders 27 located on middle line C1 and force F2 to the other slider 27 located on middle line C1. Although movement of the right slider 27 applies pressure to the sensing means in the receiving chamber 28, the left slider 27 moves in the guide bore 25 and offsets the pressure. Since the production of pressure is suppressed, the opposing sliders 27 prevent the sensing means from sensing the pressure produced by the revolution about position O. The gel-like material has the same effect as that of the first embodiment during rotation about position O' and will thus not be described here.

The present invention may be embodied as described below.

1) Although the silicone gel is employed as the actuator in the first embodiment, any other gel-like material may basically be used as long as there are no chemical effects on the circuit substrate 1, the pressure detecting element 5, or the like. (For example, a high molecular weight gel, which is composed mainly of polyvinyl alcohol may be employed.) Particles of an appropriate material (metal, ceramic, synthetic resin or the like) having optimal mass may be dispersed in the gel-like material to adjust the mass of the gel-like material. This adjusts the output sensitivity of the yaw rate detector 12.

If metal is used as the material dispersed in the gel-like material, it is preferable that metal having a relatively high specific gravity such as copper, iron, and nickel is employed. A plurality of metals may be employed. Furthermore, a mixture of metal, ceramic, and synthetic resin may also be employed;

2) In the first and the second embodiments, a C-shaped diaphragm type semiconductor pressure sensitive sensor chip that uses the strain dispersion gauges 8 is employed as the pressure detecting element 5. However, any kind of pressure detecting element may be used as long as there are no openings (through holes) in its surface. (For example, a diaphragm type pressure sensitive sensor chip or a diaphragm type capacity pressure sensitive sensor chip employing thin film gauges may be used.)

3) In the second embodiment, the guide bores 25 are arranged in a cross-like manner. However, the number of guide bores 25, which are arranged symmetrically and radially with respect to position O', may be increased. Furthermore, sliders that are identical and have the same mass may be slidably accommodated in each guide bore 25.

4) In the second embodiment, the silicone gel may be replaced with a biasing means such as coil springs that have the same biasing force. The biasing means may be provided on the ends of each slider 27 to maintain the slider 27 at a predetermined position when there is no rotation. By changing the biasing force of the biasing means, the output sensitivity of the yaw rate detector may be altered and adjusted.

In the yaw rate detector above, the sensing surface of the semiconductor pressure sensor is located at a position corresponding to ½ the thickness, or the middle, of the gel-like material. When acceleration is applied in the thickness direction of the gel-like material, compressive force is applied to half the thickness of the gel-like material, while tensile force is applied to the remaining half of the gel-like material. These forces are offset by each other at locations corresponding to ½ the thickness of the gel-like material, or the sensing surface of the semiconductor pressure sensor. This prevents the semiconductor pressure sensor from being actuated when acceleration is applied in the thickness direction. This improves the accuracy of the yaw rate detector.

The pressure detecting element is a sensor chip that has no openings on its surface, such as a C-shaped diaphragm type semiconductor pressure sensitive sensor chip using strain dispersion gauges, a diaphragm type pressure sensitive sensor chip using thin film gauges, and a diaphragm type capacity pressure sensitive sensor chip using thin film gauges.

It should be apparent to those skilled in the art that the present invention may be embodied in many other specific forms without departing from the spirit or scope of the invention. The present invention is not restricted to the above description, and may also be modified within the scope of the appended claims.

What is claimed is:

1. A yaw rate detector for detecting the angular velocity of a traveling object, wherein the yaw rate detector comprises:
   an actuator substance having a predetermined shape and uniform density when at rest, wherein pressure changes are produced in the actuator substance when the detector is subjected to centrifugal force;
   a body for retaining the actuator substance, the body comprising a flat circuit substrate for supporting the actuator substance and an upper housing cooperating with the circuit substrate to determine the thickness of the actuator substance;
   a sensor located centrally within the actuator substance for reacting to pressure changes in the actuator substance, the sensor having a central axis, wherein the sensor simultaneously reacts to pressure changes at two points located in the actuator substance, wherein the two points are located on a center-line of the detector, on opposite sides of the central axis of the sensor, and at equal distances from the central axis of the sensor, the sensor being mounted on the circuit substrate and including a thin portion serving as a diaphragm wherein a diaphragm surface of the sensor is located half-way between the circuit substrate and the upper housing.

2. The yaw rate detector as set forth in claim 1, wherein pressure changes in the actuator substance are converted to a physical quantity by the sensor and are electrically transmitted from the sensor.

3. The yaw rate detector as set forth in claim 2, wherein strain produced by pressure acting on the sensor varies an electric signal from the sensor.

4. The yaw rate detectors set forth in claim 1, wherein the actuator substance is a gel-like material.

5. The yaw rate detector as set forth in claim 4, wherein solid particles are dispersed in the gel-like material.

6. A yaw rate detector for detecting the angular velocity of a traveling object, wherein the yaw rate detector comprises:
   an actuator substance having a symmetrical shape and uniform density when at rest, wherein pressure changes are produced in the actuator substance when the detector is subjected to centrifugal force;
   a body for retaining the actuator substance;
   a sensor located centrally within the actuator substance for reacting to pressure changes in the actuator substance, the sensor having a central axis, wherein the sensor simultaneously reacts to pressure changes in the actuator substance that occur at any two points in the actuator substance located on opposite sides of the sensor and at equal distances from the central axis of the sensor; and
   a slider located on each of two opposite sides of the sensor such that one side of each slider contacts the actuator substance wherein each slider is free to move along an axis.

7. The yaw rate detector as set forth in claim 6, wherein the body has a pair of parallel planar surfaces contacting the actuator substance, and wherein the actuator substance has a generally flat shape with a predetermined thickness, which is maintained by the planar surfaces, wherein planar surfaces permit the actuator substance to be displaced only in a direction that is parallel to the planar surfaces, and wherein the sensor is deformed by pressure changes produced in the actuator substance in accordance with centrifugal force.

8. The yaw rate detector as set forth in claim 7, wherein a diaphragm surface of the sensor is located half-way between the planar surfaces.

9. The yaw rate detector as set forth in claim 6, wherein, the body includes:
   a flat circuit substrate for supporting the actuator substance, wherein the sensor is mounted on the circuit substrate;
   an upper housing cooperating with the circuit substrate to determine the thickness of the actuator substance; and
   a spacer arranged between the circuit substrate and the upper housing for separating the circuit substrate and the upper housing by a uniform distance.

10. The yaw rate detector as set forth in claim 9, wherein the circuit substrate includes a vent hole, and wherein the sensor is mounted on the circuit substrate to surround and enclose the vent.

11. The yaw rate detector as set forth in claim 6, wherein the sensor includes a diaphragm-type semiconductor pressure sensitive chip, and wherein pressure changes in the actuator substance are converted to a physical quantity by the sensor and are electrically transmitted from the sensor.

12. The yaw rate detector as set forth in claim 11, wherein the sensor is formed by anisotropically etching a bottom portion of a rectangular parallelepiped silicon base material to define a pyramidal trapezoid, and wherein a thin portion serving as a diaphragm is arranged above the etched portion.

13. A method for detecting angular velocity, the method comprising:
   locating a sensor with a diaphragm surface in the center of an actuator substance to form a detector, wherein the actuator substance has a predetermined shape, thickness and a uniform density when at rest, the diaphragm surface being located at a position one half the entire thickness of the actuator substance;
   retaining the actuator substance in a body to permit displacement of the actuator substance only in predetermined directions when the detector is moved;
   deforming the sensor by pressure changes in the actuator, wherein the pressure changes are caused by motion of the detector;
   simultaneously detecting pressure changes in the actuator substance at two points in the actuator substance, upon motion of the detector, wherein the two points are located on a center-line of the detector, on opposite sides of the sensor, and at equal distances from the sensor.

* * * * *

UNITED STATES PATENT AND TRADEMARK OFFICE
CERTIFICATE OF CORRECTION

PATENT NO. : 6,009,752
DATED : January 4, 2002
INVENTOR(S) : Hitoshi Iwata

It is certified that error appears in the above-identified patent and that said Letters Patent is hereby corrected as shown below:

<u>Title page,</u>
Item [73], Assignee, replace "Kabushiki Kaisha Tokai Rika Denki" with
-- Kabushiki Kaisha Tokai Rika Denki Seisakusho --.

Signed and Sealed this

Fifth Day of November, 2002

Attest:

JAMES E. ROGAN
Attesting Officer     *Director of the United States Patent and Trademark Office*

UNITED STATES PATENT AND TRADEMARK OFFICE
CERTIFICATE OF CORRECTION

PATENT NO.     : 6,009,752
DATED          : January 4, 2000
INVENTOR(S)    : Hitoshi Iwata It is certified that error appears in the above-identified patent and that said Letters Patent is hereby corrected as shown below:

<u>Title page,</u>
Item [73], Assignee, replace "Kabushiki Kaisha Tokai Rika Denki Seisakusho, Japan" with
-- Kabushiki Kaisha Tokai Rika Denki Seisakusho, Aichi-ken, Japan --.

Signed and Sealed this

Eighteenth Day of February, 2003

JAMES E. ROGAN
*Director of the United States Patent and Trademark Office*